Feb. 21, 1956   C. S. JEWETT   2,735,264
NOZZLE CONSTRUCTION FOR JET ENGINES
Filed Sept. 30, 1948   2 Sheets-Sheet 2
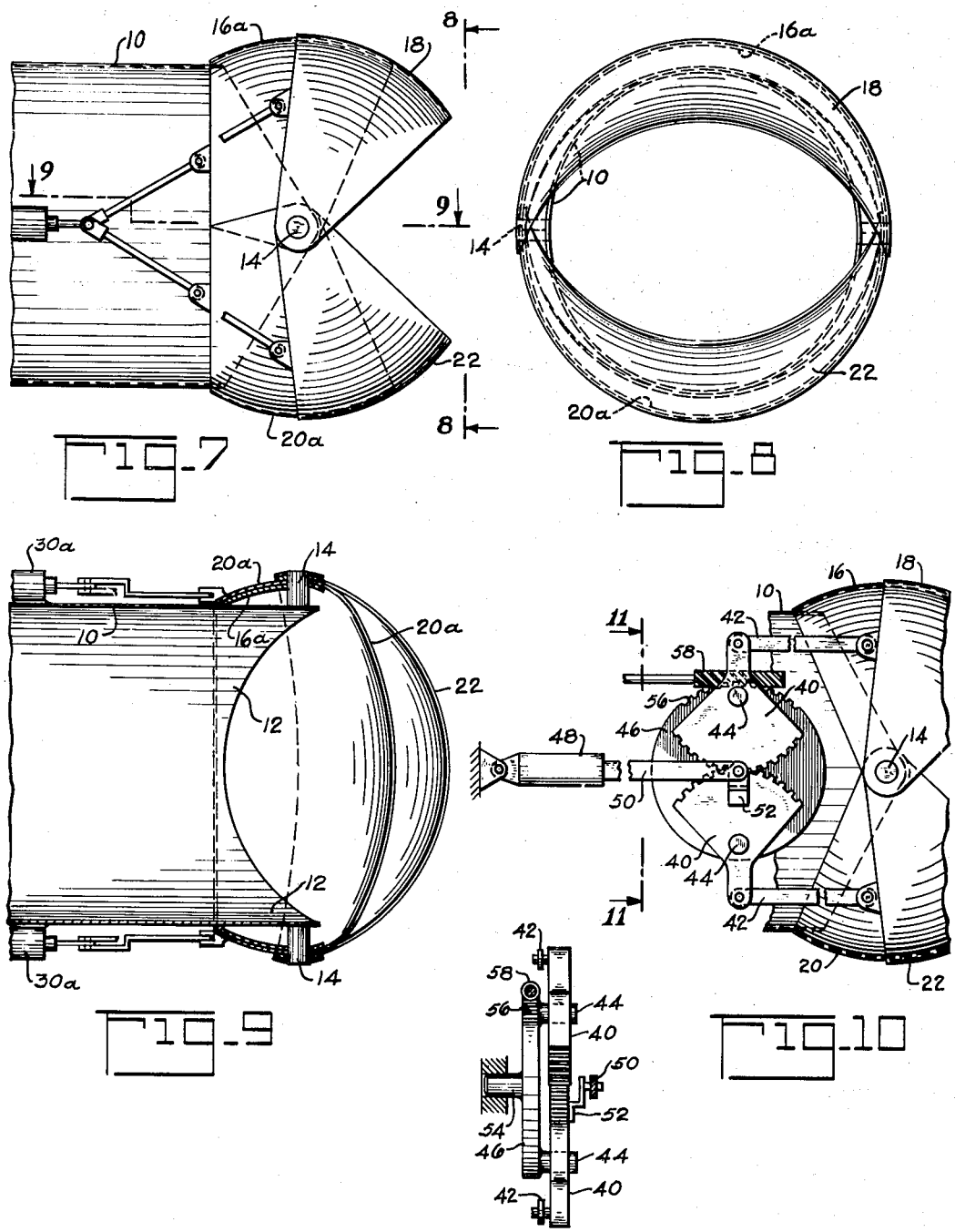
INVENTOR.
CHARLES S. JEWETT.
BY
ATTORNEY United States Patent Office 2,735,264
Patented Feb. 21, 1956

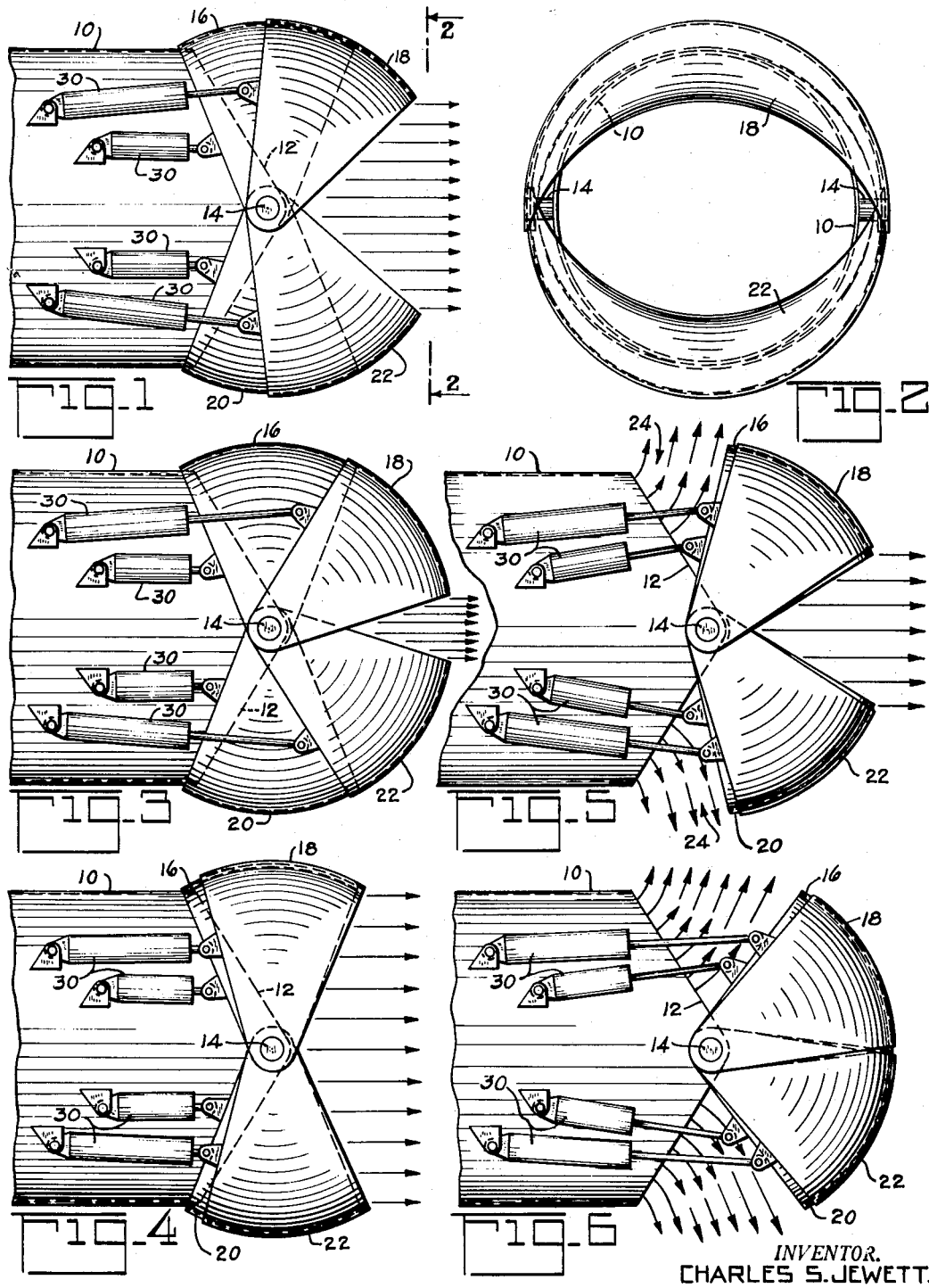

2,735,264

NOZZLE CONSTRUCTION FOR JET ENGINES

Charles S. Jewett, Ramsey, N. J., assignor to Curtiss-Wright Corporation, a corporation of Delaware Application September 30, 1948, Serial No. 51,881

11 Claims. (Cl. 60—35.55)

This invention relates to jet engines and is particularly directed to an adjustable nozzle construction for such engines.

The invention is directed to the clam-shell-like adjustable nozzle construction for jet engines illustrated in the copending application of Ambrose et al., Serial No. 51,914, filed September 30, 1948, now Patent No. 2,635,419 patented April 21, 1953.

It is an object of this invention to provide an adjustable nozzle construction in which the nozzle can be progressively adjusted from a maximum thrust position to a minimum thrust position and then progressively to positions of increasing drag, thereby providing for smooth control of the aircraft thrust. This invention is particularly useful in connection with aircraft engines utilizing the jet propulsive thrust of the engine exhaust gases.

Specifically, the adjustable nozzle of the present invention comprises a double clam-shell-like construction mounted adjacent to the discharge end of the engine exhaust duct, each half of said nozzle comprising a pair of concentric spherical segments pivotally movable relative to each other. Each of said segments subtends an angle of approximately 180° about the duct axis and is pivotally mounted at its diametrically opposed ends by trunnions disposed externally of and on diametrically opposed sides of said duct so that said segments are pivotally movable across at least a portion of the discharge end of said duct. In addition, the nozzle segments are interconnected in such a manner that each segment of one pair is restrained to pivotal movement equal to but in the opposite rotative direction of the movement of a segment of the other pair in such a manner that the interconnected segments are disposed on opposite sides of the duct axis and remain symmetrically positioned relative to said axis. For steering purposes, means may also be provided for non-symmetrically positioning the nozzle segments so as to direct the exhaust jet at an angle to the axis of the exhaust duct.

Other objects of the invention will become apparent upon reading the annexed detailed description in connection with the drawing in which:

Figure 1 is a schematic plan view of an engine exhaust duct having an adjustable nozzle construction embodying the invention, the nozzle being positioned for an intermediate value of thrust;

Figure 2 is an end view taken along line 2—2 of Figure 1;

Figures 3 and 4 are schematic views similar to Figure 1 but illustrating the nozzle in position for maximum and minimum forward thrust respectively.

Figures 5 and 6 are plan views similar to Figure 1 but illustrating the nozzle in position for moderate and maximum drag respectively;

Figure 7 is a plan view similar to Figure 1 but for a slightly modified construction;

Figures 8 and 9 are views taken along lines 8—8 and 9—9 respectively of Figure 7;

Figure 10 is a schematic view illustrating means for providing either symmetrical or non-symmetrical adjustment of the nozzle segments; and Figure 11 is a view taken along line 11—11 of Figure 10.

Referring first to Figures 1 and 2, reference numeral 10 designates an exhaust duct of an aircraft engine, as for example a turbo-jet engine, in which the exhaust gases discharge rearwardly of said duct for providing the aircraft with forward propulsive thrust. As illustrated, the discharge end of the duct 10 is circular in cross-section and is provided with a pair of extensions 12 projecting rearwardly on diametrically opposed sides of said duct. Trunnions or stub shafts 14 are supported externally of said duct on said extensions in any suitable manner. In addition, a pair of spherical nozzle segments 16 and 18 are pivotally mounted on said trunnions 14 for pivotal movement across at least a portion of the discharge end of the duct 10 for varying its discharge opening. A second pair of spherical nozzle segments 20 and 22 are also pivotally mounted on the trunnions 14, but said second pair of segments are positioned on the diametrically opposite side of the duct axis from said first pair of segments.

Each spherical nozzle segment has a surface portion approximating the spherical surface portion of a spherical wedge with the bounding planes of said wedge intersecting on the axis of the trunnions 14. In addition, each nozzle segment subtends an angle of approximately 180° about the axis of the duct 10 and the spherical nozzle segments of each pair are nested one within the other for relative pivotal movement. In their positions of Figure 1, the spherical nozzle segments 16 and 20 form extensions of diametrically opposed sides of the duct 10 and the spherical nozzle segments 18 and 22 are movable relative to their associated segments 16 and 20 respectively for varying the discharge opening of the duct 10. Thus, the nozzle segments 18 and 22 may be moved toward each other, from their position of Figure 1, to decrease the area of said discharge opening thereby increasing the forward propulsive thrust. In addition, the segments 18 and 22 may be moved toward each other, from their position of Figure 1, to decrease the area of said discharge opening thereby increasing the forward propulsive thrust. In addition, the segments 18 and 22 may be moved away from each other, from their position in Figure 1, to increase the area of said discharge opening thereby decreasing the forward propulsive thrust. When the nozzle segments are in the positions illustrated in Figure 1, the forward propulsive thrust is at an intermediate value. When, however, the nozzle segments are in their positions of Figure 3, said thrust is a maximum and, when the nozzle segments are in their positions of Figure 4, said thrust is a minimum.

If it is decided to retard the aircraft, the engine exhaust nozzle may be moved from its position of Figure 4 of minimum forward thrust to one in which at least some of the exhaust gases discharge laterally to impose drag on the aircraft. For this purpose, each pair of nozzle segments is movable as a unit, from its position of minimum forward thrust, across the discharge end of the duct 10 toward the other pair of segments. This adjustment of the nozzle leaves a gap 24 (Figure 5) between each pair of nozzle segments and the adjacent portion of the discharge end of the exhaust duct through which at least a portion of the exhaust gases discharge laterally into the surrounding atmosphere. This lateral discharge of the exhaust gases imposes drag on the aircraft. With the nozzle positioned, as in Figure 5, a moderate amount of drag is produced. When each pair of nozzle segments is pivotally moved to their positions of Figure 6, all the exhaust gases are deflected laterally by the nozzle segments thereby imposing a maximum drag on the aircraft. In fact, with the nozzle adjusted to its position of Figure 6, a negative or reverse thrust may be obtained even, in the case of a gas turbine engine, with the turbine operating at maximum speed.

With the single clam-shell nozzle construction illustrated in the aforementioned copending application, the nozzle must be adjusted to its maximum thrust position before it can be adjusted to a position in which the exhaust gases impose a drag on the aircraft. This is analogous to an automobile control system in which it is necessary to open the engine throttle wide before the vehicle brakes can be applied. With the double clam-shell nozzle construction of the present invention, the nozzle may be progressively adjusted from its position of maximum forward thrust to its position of minimum forward thrust and thence to a position of minimum drag and finally to its maximum drag position by adjusting the nozzle sequentially from its position of Figure 3 through its position of Figures 1, 4, 5, and 6, in the order named. Accordingly, the nozzle construction of the present invention provides for improved smooth control of aircraft thrust and drag as is particularly important during landing operations. In addition to this smooth control of aircraft thrust and drag, the double clam-shell nozzle construction can be adjusted directly from its maximum drag or reverse thrust position of Figure 6 to its maximum forward thrust position of Figure 3 so that maximum thrust is quickly available if needed.

As shown in the drawing, suitable fluid motors 30 are provided for operating the spherical nozzle segments. In order that the exhaust gases discharge symmetrically relative to the duct axis, the nozzle segments are interconnected so as to remain symmetrical relative to said axis. For example, the nozzle segments 16 and 20 may be interconnected in the manner illustrated in said aforementioned Patent No. 2,635,419 and the nozzle segments 18 and 22 may be similarly interconnected. With such a construction, the nozzle segments 16 and 20 are connected together and the nozzle segments 18 and 22 are connected together so that each pair of connected segments is restrained to pivotal movement to equal angles but in opposite rotative directions about the axis of the trunnions 14. With this arrangement, the pair of nozzle segments 16 and 18 and the pair of nozzle segments 20 and 22 remain symmetrically positioned on opposite sides of the duct axis in all positions of nozzle adjustment. The particular means, however, by which the nozzle segments are interconnected forms no part of the present invention. For example, in lieu of the connection between the nozzle segments illustrated in said copending application, the nozzle segments 16 and 20 may be interconnected by connecting said segments to common motor means, as illustrated in connection with the modification of Figure 7. The nozzle segments 18 and 22 may be similarly interconnected.

When the nozzle segments are positioned for providing forward propulsive thrust, it is important that a seal be provided between the pair of nozzle segments 16 and 18, between the pair of nozzle segments 20 and 22, as well as between the nozzle segments 16 and 20 and the adjacent portion of the duct 10 in order to prevent exhaust gases from discharging forwardly therebetween. The nozzle segments of each of said pairs are disposed in concentric nested relation so that a seal element may readily be provided therebetween. In lieu of such a seal element each of said pairs of segments may be disposed sufficiently close together so as to eliminate the need for any such seal element. In addition, a seal member, not shown, is preferably provided on the exterior of the duct 10 for cooperation with the forward edges of the segments 16 and 20 when said segments are positioned as illustrated in Figures 1, 3, and 4. In place of this latter seal means the spherical segments 16 and 20 may be replaced by the spherical segments 16a and 20a as illustrated in Figures 7, 8 and 9.

The spherical segments 16a and 20a differ from the spherical segments 16 and 20 only in that their forward edges extend forwardly (to the left as viewed in the drawing) so as to contact the duct 10, whereby said side edges are disposed in a plane transverse to the duct axis and said edges closely embrace said duct to provide a seal therebetween.

In the modification of Figures 7 to 9 the spherical nozzle segments 16a and 20a may be interconnected and the pair of spherical nozzle segments 18 and 22 may be interconnected in a manner similar to the aforementioned connections between the nozzle segments of Figures 1 to 6 in order that the pair of spherical segments 16a and 18 and the pair of spherical segments 20a and 22 remain symmetrically positioned on opposite sides of the axis of the duct 10 in all positions of nozzle adjustment. As illustrated in the drawing, however, the modification of Figures 7 to 9 also differs from the modification of Figures 1 to 6 in that the spherical segments 16a and 20a are connected to the same fluid motors 30a for operation thereby and the spherical segments 18 and 22 of Figures 7 to 9 are similarly connected together to common fluid motors (not shown) for operation thereby. This interconnection of the nozzle segments serves to maintain the aforementioned symmetrical disposition of said segments. Except as described, the structure of Figures 7 to 9 is identical to that of Figures 1 to 6 and like parts have been indicated by like reference numerals.

For steering purposes, means may be provided for directing the exhaust jet at an angle to the axis of the duct 10. In the case of an aircraft engine, this feature would, for example, facilitate manipulation of the aircraft on the ground. For this purpose the axis of the trunnions 14 is made vertical. With said trunnion axis vertical, if the nozzle segments are non-symmetrically positioned relative to the axis of the duct 10, the thrust obtained from the exhaust jet will be horizontally inclined to the duct axis thereby tending to turn the aircraft.

Figures 10 and 11 schematically illustrate an arrangement whereby the nozzle segments 18 and 22 provide the duct 10 with an adjustable discharge opening which normally is symmetrical relative to the duct axis. In addition, means are provided to position said segments so as to provide a non-symmetrical discharge opening. As illustrated, the nozzle segments 18 and 22 are connected to similar gear sectors 40 by means of links 42, each link 42 being pivotally connected at one end to a gear sector and at its other end to a nozzle segment 18 or 22. The gear sectors 40 are in mesh and each is mounted about a pivot pin 44 carried by a plate 46. A fluid motor 48 is pivotally connected, by means of a piston rod 50, to a bracket 52 on one of the gear sectors 40 in the zone of meshing engagement of said gears for adjusting the nozzle segments through said gears 40 and links 42. With this construction and with the plate 46 in the position illustrated, the nozzle segments 18 will remain symmetrically positioned, relative to the duct axis, in all of their positions of adjustment by the motor 48. The plate 46 is mounted for rotative adjustment about the axis of its journal 54, the pivot axes of the gears 40 being symmetrically positioned on opposite sides of said journal. For this purpose the plate 46 is provided with gear teeth 56 meshing with a worm gear 58. If the worm gear 58 is rotated so that the plate 46 is rotated clockwise (Figure 10), the nozzle segments 18 will each be given a clockwise adjustment and the exhaust gases will discharge to the left of the axis of the exhaust duct, as viewed from the rear of said duct. Similarly, if the worm 58 is rotated so that the plate 46 is rotated counter-clockwise from its position of Figure 10, the exhaust gases will discharge to the right of the duct axis. Thus the direction of the exhaust jet may be varied by rotative adjustment of the plate 46.

By connecting the motor 48 to the gear sectors 40 in the zone of their meshing engagement, the direction of the exhaust jet changes, as the plate 40 is rotatively adjusted, but the actual size of the discharge opening provided by the nozzle segments remains substantially unchanged. If desired, similar means may be provided for adjusting the nozzle segments 16 and/or 16a.

If the nozzle segments are only to be adjusted symmetrically relative to the axis of the duct 10, the axis of the trunnions 14, although perpendicular to the axis of said duct, need not be vertical but said axis may be horizontal or inclined to the horizontal.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. An adjustable nozzle construction for an engine having an exhaust duct through which engine exhaust gases discharge for providing forward propulsive thrust; said nozzle construction comprising a first pair of relatively movable concentric members, each of said members having its own means pivotally mounting said member adjacent to the discharge end of said duct about an axis directed through said duct; and a second pair of relatively movable concentric members, each of said second members having its own means pivotally mounting said second member adjacent to the discharge end of said duct about an axis directed through said duct parallel to said first mentioned axis, said members extending from one side of said duct to the other and being pivotally movable across at least a portion of the discharge end of said duct with one of the members of each pair being smaller than the other member of said pair so as to be pivotally movable within said other member.

2. An adjustable nozzle construction for an engine having an exhaust duct through which engine exhaust gases discharge for providing forward propulsive thrust; said nozzle construction comprising a first pair of concentric members pivotally mounted adjacent to the discharge end of said duct about an axis directed through said duct; a second pair of concentric members pivotally mounted adjacent to the discharge end of said duct about an axis directed through said duct parallel to said first mentioned axis, said members extending from one side of said duct to the other with the members of each pair being pivotally movable one within the other; means interconnecting a member of said first pair with a member of said second pair for positioning said members on opposite sides of the duct axis and for restraining said members to movement in opposite rotative directions; and means similarly interconnecting the other member of said first pair with the other member of said second pair.

3. An adjustable nozzle construction for an engine having an exhaust duct through which engine exhaust gases discharge for providing forward propulsive thrust; said nozzle construction comprising a first pair of concentric members; a second pair of concentric members; means disposed externally of and adjacent to the discharge end of said duct for pivotally mounting each member about an axis directed through said duct; said members extending from one side of said duct to the other and being pivotally movable across at least a portion of the discharge end of said duct with the members of each pair being pivotally movable one within the other; means interconnecting a member of said first pair with a member of said second pair to maintain said members symmetrically positioned on opposite sides of the axis of said duct; and means similarly interconnecting the other member of said first pair with the other member of said second pair.

4. An adjustable nozzle construction for an engine having an exhaust duct through which engine exhaust gases discharge for providing forward propulsive thrust; said nozzle construction comprising a first pair of concentric members pivotally mounted adjacent to the discharge end of said duct about an axis directed through said duct; and a second pair of concentric members pivotally mounted adjacent to the discharge end of said duct about an axis directed through said duct parallel to said first mentioned axis, said members extending from one side of said duct to the other and being pivotally movable across at least a portion of the discharge end of said duct with the members of each pair being pivotally movable one within the other, one member of each of said first and second pairs being positionable so as to form diametrically opposed extensions of their respective sides of the discharge end of said duct with the other member of each pair being movable to vary the discharge opening of said duct.

5. An adjustable nozzle construction for an engine having an exhaust duct through which engine exhaust gases discharge for providing forward propulsive thrust; said nozzle construction comprising first and second pairs of relatively movable concentric members; trunnion means disposed externally of said duct on opposite sides of and adjacent the discharge end of said duct for pivotally mounting said members about a common axis directed through said duct, each of said members having its own pivotal mounting on said trunnion means and said members being pivotally movable across at least a portion of the discharge end of said duct with one of the members of each pair being smaller than the other member of said pair so as to be pivotally movable within said other member.

6. An adjustable nozzle construction for an engine having an exhaust duct through which engine exhaust gases discharge for providing forward propulsive thrust; said nozzle construction comprising a first pair of relatively movable concentric spherical segments, each of said segments having its own means pivotally mounting said segment adjacent to the discharge end of said duct about an axis directed through said duct; and a second pair of relatively movable concentric spherical segments, each of said second segments having its own means pivotally mounting said second segment adjacent to the discharge end of said duct about an axis directed through said duct parallel to said first mentioned axis, each of said segments being pivotally movable across at least a portion of the discharge end of said duct.

7. An adjustable nozzle construction for an engine having an exhaust duct through which engine exhaust gases discharge for providing forward propulsive thrust; said nozzle construction comprising a first pair of relatively movable concentric spherical segments, each of said segments having its own means pivotally mounting said segment adjacent to the discharge end of said duct about an axis directed through said duct; and a second pair of relatively movable concentric spherical segments, each of said second segments having its own means pivotally mounting said second segment adjacent to the discharge end of said duct about an axis directed through said duct parallel to said first mentioned axis, said segments extending from one side of said duct to the other and being pivotally movable across at least a portion of the discharge end of said duct with one of the segments of each pair having a smaller radius than the other segment of said pair so as to be pivotally movable within said other segment.

8. An adjustable nozzle construction for an engine having an exhaust duct through which engine exhaust gases discharge for providing forward propulsive thrust; said nozzle construction comprising a first pair of concentric spherical segments pivotally mounted adjacent to the discharge end of said duct about an axis directed through said duct; and a second pair of concentric spherical segments pivotally mounted adjacent to the discharge end of said duct about an axis directed through said duct parallel to said first mentioned axis, the segments of each pair being pivotally movable one within the other; means interconnecting a segment of said first pair with a segment of said second pair to maintain said members symmetrically positioned on opposite sides of the axis of said duct; and means similarly interconnecting the other segment of said first pair with the other segment of said second pair.

9. An adjustable nozzle construction for an engine having an exhaust duct with a circular discharge opening through which the engine exhaust gases discharge for providing forward propulsive thrust; said nozzle construction comprising two pairs of concentric relatively movable spherical segments; each of said segments having its own means pivotally mounting said segment about an axis disposed adjacent to discharge end of said duct and common to the pivotal axis of the other segments and one of the spherical segments of each pair having a smaller radius than the other segment of said pair so as to be pivotally movable within said other segment.

10. An adjustable nozzle construction for an engine having an exhaust duct with a circular discharge opening through which the engine exhaust gases discharge for providing forward propulsive thrust; said nozzle construction comprising two pairs of concentric relatively movable spherical segments; and a pair of trunnions disposed externally of said duct for pivotally mounting said segments about a common axis disposed adjacent to and directed diametrically across the discharge end of said duct, each of said segments having its own pivotal mounting on said trunnions and said segments extending from one side of said duct to the other and being pivotally movable across at least a portion of the discharge end of said duct with one of the segments of each pair having a smaller radius than the other segment of said pair so as to be pivotally movable within said other segment.

11. An adjustable nozzle construction for an engine having an exhaust duct with a circular discharge opening through which the engine exhaust gases discharge for providing forward propulsive thrust; said nozzle construction comprising two pairs of concentric spherical segments; a pair of trunnions disposed externally of said duct for pivotally mounting said segments about a common axis disposed adjacent to and directed diametrically across the discharge end of said duct, said segments extending from one side of said duct to the other and being pivotally movable across at least a portion of the discharge end of said duct with the segments of each pair being pivotally movable one within the other; means interconnecting a segment of said first pair with a segment of said second pair for restraining said segments to movement in opposite rotative directions; and means interconnecting the other segment of said first pair with the other segment of said second pair for restraining said latter segments to movement in opposite rotative directions.

References Cited in the file of this patent

UNITED STATES PATENTS

| 1,572,812 | Rees | Feb. 9, 1926 |
| 2,418,488 | Thompson | Apr. 8, 1947 |
| 2,551,372 | Haltenberger | May 1, 1951 |
| 2,557,435 | Imbert | June 19, 1951 |

FOREIGN PATENTS

| 171,600 | Great Britain | Nov. 24, 1921 |
| 588,501 | Great Britain | May 27, 1947 |